W. S. ALLYN.
SPRING WHEEL.
APPLICATION FILED JUNE 17, 1912.
1,069,663.
Patented Aug. 12, 1913.
2 SHEETS—SHEET 1.
Fig. I.
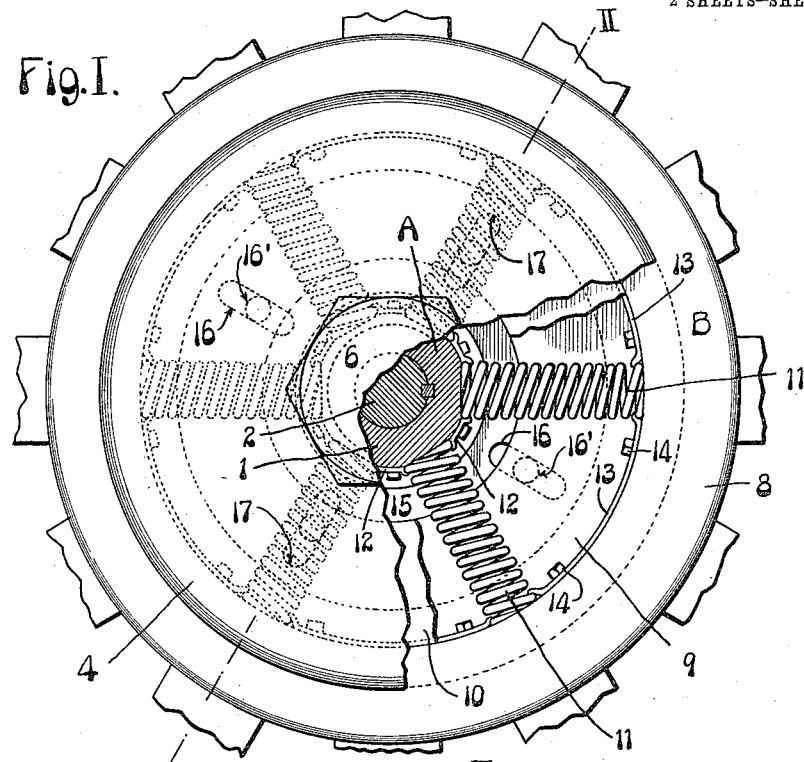
Fig. II.
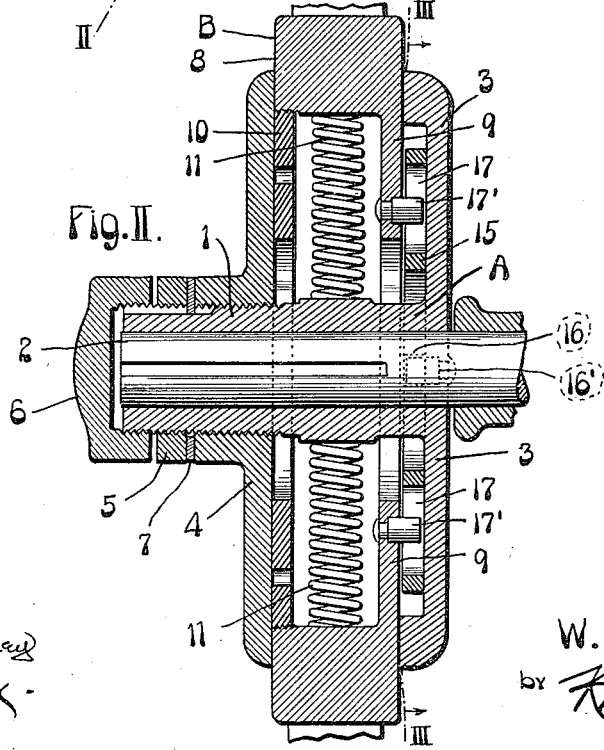
Attest
A. J. McCauley
E. B. Finney
Inventor:
W. S. Allyn
by Knight & Cook
Attys.

W. S. ALLYN.
SPRING WHEEL.
APPLICATION FILED JUNE 17, 1912.
1,069,663.
Patented Aug. 12, 1913.
2 SHEETS—SHEET 2.
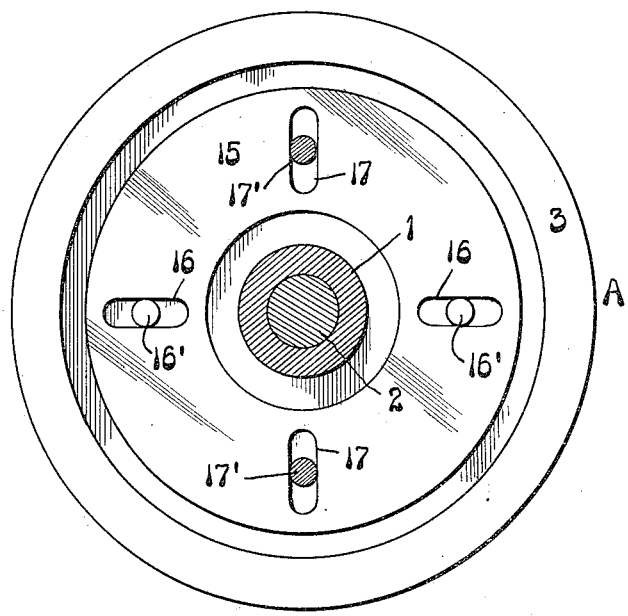
Fig. III.
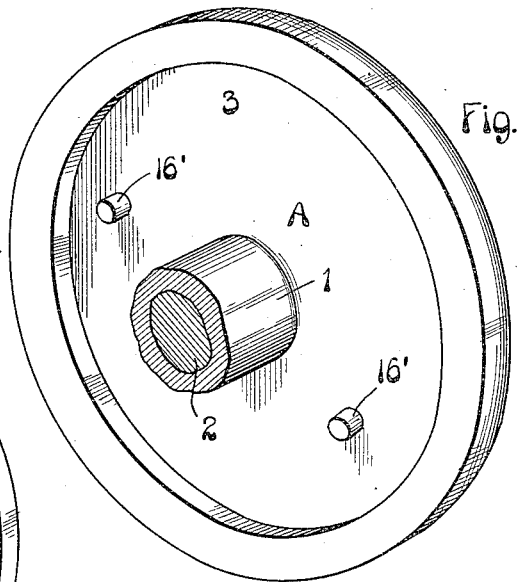
Fig. IV.
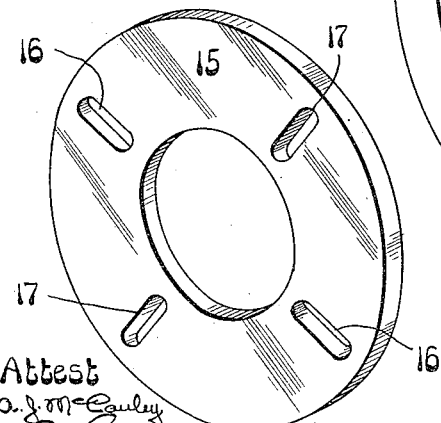
Fig. V.
Attest
A. J. McCauley
E. B. Pinne
Inventor:
W. S. Allyn
by Knight Cook
Attys.

UNITED STATES PATENT OFFICE.

WALTER S. ALLYN, OF THOMPSONVILLE, ILLINOIS, ASSIGNOR OF ONE-HALF TO THOMAS G. PUCKETT, OF THOMPSONVILLE, ILLINOIS.

SPRING-WHEEL.

1,069,663.

Specification of Letters Patent.

Patented Aug. 12, 1913.

Application filed June 17, 1912. Serial No. 704,072.

*To all whom it may concern:*

Be it known that I, WALTER S. ALLYN, a citizen of the United States of America, residing at Thompsonville, in the county of Franklin and State of Illinois, have invented certain new and useful Improvements in Spring-Wheels, of which the following is a full, clear, and exact description, reference being had to the accompanying drawings, forming a part of this specification.

My invention relates to a spring wheel and has for its object the production of a wheel comprising hub sections, yieldingly connected to each other, and having combined therewith means for preventing said sections from rotating independently of each other and without interfering with free vertical movement of an axle extending into the wheel hub.

The invention also includes various details of construction, which will be hereinafter pointed out.

Figure I is a side elevation of the hub of my spring wheel, parts being broken away to more clearly show the interior of the hub. Fig. II is a section taken approximately on the line II—II, Fig. I. Fig. III is a vertical section taken on the line III—III, Fig. II, showing the means for preventing the hub sections from rotating independently of each other. Fig. IV is a detail perspective view of a portion of the primary hub section. Fig. V is a detail perspective view of the slotted plate with which both hub sections are loosely interlocked.

In the accompanying drawings: A designates a primary hub section comprising an elongated sleeve 1, arranged on the axle 2, and a flange 3 at the inner end of said sleeve having an outwardly projecting rim providing a ring chamber. The primary hub section also includes a flanged collar 4 screwed onto the outer end of the sleeve 1, a jam nut 5 for locking the collar 4, and a cap 6 at the outer end of the sleeve of the primary hub section. If desired, a washer 7 may be arranged between the collar 4 and the nut 5.

The secondary hub section B comprises an annulus 8, surrounding the sleeve of the primary hub section, and arranged between the flanged collar 4 and the flange 3 so as to provide a spring-chamber. The annulus 8 has an internal circular flange 9, and contains a closure ring 10, preferably screwed into the annulus. Cylindrical coiled springs 11, arranged radially within the spring-chamber between the sleeve 1 and the annulus 8 are rigidly connected to said parts by clips 12 and 13 respectively. I preferably utilize two circular series of the clips, the clips 13 at the outer ends of the springs being attached to the annulus by screws 14, and the clips 12 being connected in a similar manner to the sleeve 1. It will be noted that each clip is arranged between and fitted to two of the springs. The springs 11 allow the secondary hub section and primary hub section to move vertically independently of each other, however all of the springs yieldingly resist such movement.

To prevent the primary hub section and secondary hub section from rotating independently of each other, both of said sections are loosely interlocked with a controller ring 15 provided with two pairs of diametrically opposite radial slots 16 and 17 and located in the ring chamber formed by the rim of the flange 3. The flange 3 at the inner end of the primary hub section is provided with a pair of diametrically opposite pins 16', which extend into the radial slots 16 and the secondary hub section is provided with a pair of pins 17', extending into the radial slots 17. It will be readily understood that the controller ring 15, interlocked with the hub sections, prevents said sections from rotating independently, but as this plate is arranged loosely between the sections and loosely interlocked therewith, it does not interfere with the desired independent vertical movement of the sections and the axle, irrespective of the direction of thrust, during rotation of the spring wheel.

I claim:—

1. A spring wheel comprising a primary hub section formed with an elongated sleeve and a flange having an outwardly projecting rim providing a ring-chamber and a pair of diametrically oppositely arranged outwardly projecting pins, and a flanged collar on the outer end of the elongated sleeve, a secondary hub section formed with an annulus providing a spring-chamber and a flange having a pair of diametrically oppositely arranged inwardly projecting pins, a controller ring located within the ring-chamber and provided with two pairs of diametrically oppositely arranged radial slots for the pins of the flanges, and radially arranged cylindrical coiled springs located in the spring chamber and having their ends seating against the elongated sleeve and the annulus respectively.

2. A spring wheel comprising a primary hub section formed with an elongated sleeve and a flange having an outwardly projecting rim providing a ring-chamber and a pair of diametrically oppositely arranged outwardly projecting pins, and a flanged collar on the outer end of the elongated sleeve, a secondary hub section formed with an annulus providing a spring chamber and a flange having a pair of diametrically oppositely arranged inwardly projecting pins, a controller ring located within the ring chamber and provided with two pairs of diametrically oppositely arranged radial slots for the pins of the flanges, radially arranged cylindrical coiled springs located in the spring chamber and having their ends seating against the elongated sleeve and the annulus respectively, and a closure ring for the spring chamber fitting between the elongated sleeve and the annulus.

WALTER S. ALLYN.

In the presence of—
JOHN C. ELLIOTT,
J. A. KNIGHT.

---

Copies of this patent may be obtained for five cents each, by addressing the "Commissioner of Patents, Washington, D. C."